(No Model.)
P. MULLANE.
COLLAR FASTENER.
No. 587,850. Patented Aug. 10, 1897.
Fig. 1.
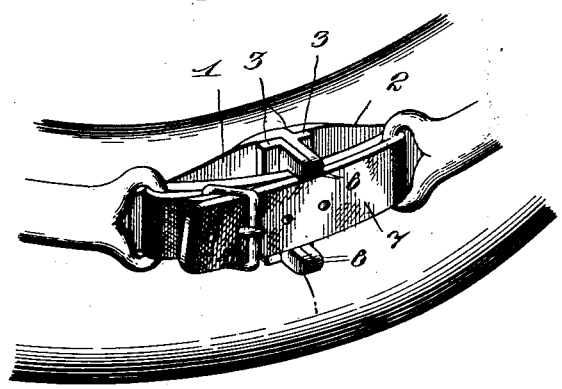
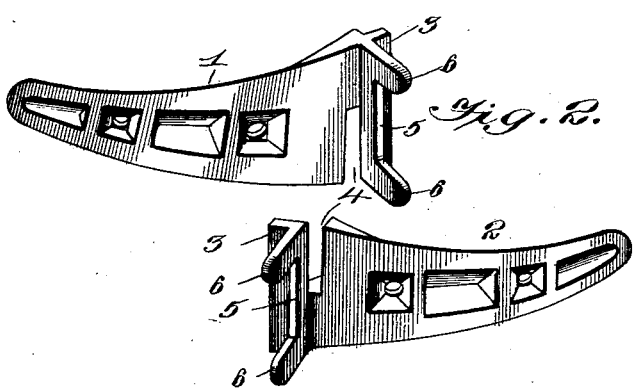
Fig. 2.
Fig. 3.
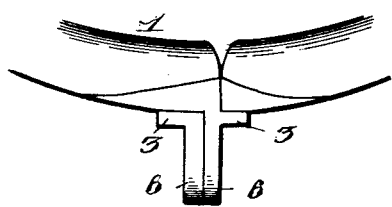
Fig. 4.
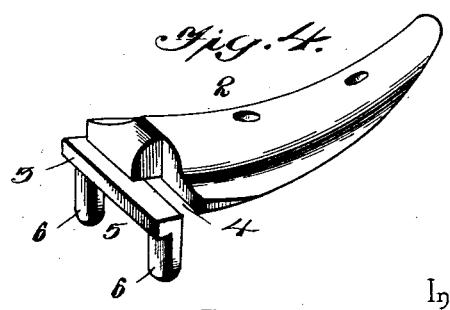
Inventor
Patrick Mullane
Witnesses
O. J. Koerth.
V. B. Hillyard.
By his Attorneys,
C. A. Snow & Co.

UNITED STATES PATENT OFFICE.

PATRICK MULLANE, OF MOLINE, ILLINOIS.

COLLAR-FASTENER.

SPECIFICATION forming part of Letters Patent No. 587,850, dated August 10, 1897.

Application filed April 22, 1896. Serial No. 588,668. (No model.)

*To all whom it may concern:*

Be it known that I, PATRICK MULLANE, a citizen of the United States, residing at Moline, in the county of Rock Island and State of Illinois, have invented a new and useful Collar-Fastener, of which the following is a specification.

This invention relates to fasteners for coupling the ends of horse-collars, and is designed to provide an improved means for this purpose which will be simple, effective, durable, and capable of being easily manipulated for instantly clasping or releasing the ends of the collar as required and which will be locked by the strap employed for connecting the hames.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a detail view of the coupling ends of a horse-collar, showing the invention applied. Fig. 2 is a detail view showing the parts of the fastener separated. Fig. 3 is a detail view, in side elevation, of the coupling ends of the fastener. Fig. 4 is a view of a coupling member inverted.

Corresponding and like parts are referred to in the following description and indicated in the several views of the accompanying drawings by the same reference-characters.

The fastener comprises similar parts 1 and 2, which are secured to the loose ends of a horse-collar in any convenient and substantial way. The parts or members 1 and 2 are constructed so as to form rights and lefts, and each has a transverse slot adjacent to the coupling end and a lip or flange 3 forward of the slot 4 and extending the full width of the part or member. The slot 4 extends inward from one edge about half the width of the member, and the slots in the members open outward through opposite edges to admit of the parts being coupled and uncoupled by a lateral or sidewise movement. The lower face of the lip or flange 3 is about in the same plane as the outer side of the body of the member, so that when the members are coupled the lip or flange of one will overlap and rest upon the outer side of the body of the other, thereby making a neat and substantial joint. A rib 5 extends about at right angles from the inner edge of the lip or flange 3 and forms the outer wall of the slot 4 and is notched or depressed in its outer edge, forming side extensions 6, which constitute guards to retain the hame-strap 7 in place when the parts of the fastening are coupled, as shown most clearly in Fig. 1. The butting ends of the parts, the overlapping lips or flanges, and the meeting ribs serve to brace the fastener and preserve the shape of the collar, which is essential in the provision of an effective coupling for horse-collars. The coupling and the uncoupling are effected by moving the members or parts laterally, so that the ribs 5 will slide by one another, so as to admit of their lower edge portion entering the slots 4. The ribs 5 form the interlocking elements to prevent the separation of the members after the parts of the couplers are engaged, and the butting ends below the lips 3 prevent the parts from moving toward each other. After the parts of the fastener are engaged the hame-strap 7 is passed between the guards or extensions 6, thereby securing the parts against uncoupling, which can be effected only by first removing the strap 7 from the notches in the outer edges of the ribs 5.

What I claim is—

1. In a horse-collar fastener, the combination of similarly-formed members having transverse slots adjacent to their coupling ends extending inward from opposite edges for about half the width of the members, and having lips in advance of the said slots to overlap and bear against the outer side of the members opposite those of which they form a part, and side extensions or guards projecting outward from the said lips to receive between the strap by means of which the hames are connected, whereby the parts of the fastener are prevented from lateral displacement, substantially as set forth.

2. In a horse-collar fastener, the combination of similarly-formed members having transverse slots adjacent to their coupling ends extending inward from opposite edges for about half the width of the members, and having lips in advance of the said slots to overlap and bear against the outer side of the members opposite those of which they form a part, and ribs projecting outwardly from the said lips and adapted to come together, and having their outer edges correspondingly notched to form side extensions or guards, substantially as set forth.

In testimony that I claim the foregoing as my own I have hereto affixed my signature in the presence of two witnesses.

PATRICK MULLANE.

Witnesses:
 FRANK GOTTSCHE,
 HERSCHEL CARSLEY.